United States Patent
Shpiner et al.

(10) Patent No.: US 10,505,677 B2
(45) Date of Patent: Dec. 10, 2019

(54) FAST DETECTION AND RETRANSMISSION OF DROPPED LAST PACKET IN A FLOW

(71) Applicant: Mellanox Technologies, Ltd., Yokneam (IL)

(72) Inventors: Alexander Shpiner, Nesher (IL); Adi Menachem, Hod Hasharon (IL); Eitan Zahavi, Zichron Yaakov (IL); Noam Bloch, Bat Shlomo (IL); Ariel Shahar, Jerusalem (IL)

(73) Assignee: MELLANOX TECHNOLOGIES, LTD., Yokneam (IL)

(*) Notice: Subject to any disclaimer, the term of this patent is extended or adjusted under 35 U.S.C. 154(b) by 194 days.

(21) Appl. No.: 15/796,803

(22) Filed: Oct. 29, 2017

(65) Prior Publication Data

US 2019/0132085 A1    May 2, 2019

(51) Int. Cl.
*H04L 1/08* (2006.01)
*H04L 1/18* (2006.01)
*H04L 1/16* (2006.01)

(52) U.S. Cl.
CPC .............. *H04L 1/08* (2013.01); *H04L 1/1642* (2013.01); *H04L 1/1806* (2013.01)

(58) Field of Classification Search
CPC ....... H04L 1/08; H04L 1/1642; H04L 1/1806; H04L 1/1896
See application file for complete search history.

(56) References Cited

U.S. PATENT DOCUMENTS

| | | |
|---|---|---|
| 2005/0076136 A1 | 4/2005 | Cho et al. |
| 2011/0064084 A1 | 3/2011 | Tatar et al. |
| 2015/0030036 A1* | 1/2015 | Wang ............... H04L 69/04 370/477 |

OTHER PUBLICATIONS

Amante et al., "IPv6 Flow Label Specification", Request for Comments 6437, 15 pages, Nov. 2011.
Allman et al., "TCP Congestion Control", Request for Comments 2581, 14 pages, Apr. 1999.

* cited by examiner

*Primary Examiner* — Duc C Ho
(74) *Attorney, Agent, or Firm* — Kligler & Associates (57) ABSTRACT

A network element processes a data flow in accordance with a communications protocol in which respective incremental sequence numbers are assigned to segments of the data flow. The segments are sent from the network element to the other network element in order of the sequence numbers, and respective acknowledgements are received from the other network element. The acknowledgements may include the highest sequence number of the segments of the flow that were received in the other network element. After transmitting the last segment of the data flow an additional segment is sent to the other network element. When it is determined from an acknowledgement of the additional segment that the last segment of the data flow was not received by the other network element, the last segment is retransmitted.

22 Claims, 5 Drawing Sheets

| Offsets | Octet | | | | 0 | | | | | | | | 1 | | | | | | | | 2 | | | | | | | | 3 | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port ||||||||||||||| Destination port |||||||||||||||||
| 4 | 32 | Sequence number ||||||||||||||||||||||||||||||||
| 8 | 64 | Acknowledgment number (if ACK set) ||||||||||||||||||||||||||||||||
| 12 | 96 | Data offset |||| Reserved 0 0 0 ||| N S | C W R | E C E | U R G | A C K | P S H | R S T | S Y N | F I N | Window Size ||||||||||||||||
| 16 | 128 | Checksum ||||||||||||||||| Urgent pointer (if URG set) |||||||||||||||
| 20 | 160 | Options (if data offset>5. Padded at the end with "0" bytes if necessary.) ||||||||||||||||||||||||||||||||
| ... | ... | ... ||||||||||||||||||||||||||||||||||

FIG. 5

FAST DETECTION AND RETRANSMISSION OF DROPPED LAST PACKET IN A FLOW

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to transmission of digital information over a communications network. More particularly, this invention relates to arrangements for detecting and correcting packet loss using information derived from dedicated packets.

2. Description of the Related Art

The meanings of certain acronyms and abbreviations used herein are given in Table 1.

TABLE 1

| Acronyms and Abbreviations | |
| --- | --- |
| ACK | Acknowledgement |
| IB | InfiniBand |
| NACK | Negative Acknowledgement |
| NIC | Network Interface Card |
| RDMA | Remote Direct Memory Access |
| RoCE | RDMA over Converged Ethernet |
| TCP | Transmission Control Protocol |

Computer networks can suffer from congestion when the amount of traffic that is transmitted on a link exceeds the link capacity. When congestion occurs, switch buffers absorb the excess traffic. When the switch buffers fill up, the packets are usually dropped. Reliable transport protocols identify such packet drops and retransmit the dropped packets.

Completion of a flow is important metric in the evaluation of performance of a network, and is counted when all the packets of a flow arrived. It is challenging to identify a drop of the last packet of the flow.

SUMMARY OF THE INVENTION

Reliable transport algorithms are designed to guarantee arrivals of all the transmitted data from the sender to the receiver. Transport algorithms identify packet drops and retransmit the packet. Two methods are conventionally used to identify packet loss:

The first method relies on including an incremental sequence number in every packet of a flow. The receiver tracks the sequence number of received packets. The receiver expects packets to arrive in order. Using the sequence number in the arrived packet, the receiver can determine if some packet is missing in the sequence. Packets that successfully arrive in order result in an acknowledgement (ACK) from the receiver to the sender. A missing sequence number is consistent with a packet having been dropped in the network. Detection of a missing sequence number results in the receiver sending a negative acknowledgement (NACK) that includes the missing sequence number to indicate to the sender that the corresponding packet should be retransmitted.

The second method of identifying a packet drop relies on the above-mentioned ACKs and timers. The sender starts a timer after sending a packet. If the timer expires before an ACK for the packet has arrived, the sender identifies the event is signifying a packet drop and retransmits the packet. The round trip delay in the network is dependent on in-network queuing delay and, hence, is difficult to predict. Therefore, in order to avoid unnecessary retransmissions, the retransmission timer is set to a large value relative to the round trip time in the network. Hence, relying on timeout for retransmission penalizes the flow completion metric substantially.

Dropping the last packet of a flow can be only handled by the second method, since the first method would rely on a non-existent following packet.

According to disclosed embodiments of the invention, an extension to conventional transport algorithms, such as RoCE and TCP is provided to enhance the performance of lossy networks. An additional packet is added following the last packet of a flow. Receipt of the additional packet enables the receiver to identify loss of the last packet of the flow.

The additional packet can be a specially defined packet, referred to as a "control packet". The control packet generally conforms to the requirements of the transport protocol being used, and contains additional encoded information, which enables the receiver to identify it.

Alternatively, the additional packet can be a backward compatible "dummy packet", which lacks a data payload, but otherwise conforms to the format of the transport protocol. Based on its sequence number the dummy packet enables detection of an out-of-order arrival should the last packet of the flow be lost, thereby causing the receiver to respond according to the specification of the transport protocol. For example, in RoCE a NACK would cause retransmission of the last packet of the flow. In TCP retransmission would be signaled by a series of duplicate ACKs.

There is provided according to embodiments of the invention an apparatus, including a network element having communication ports connected to a data network, and electrical circuitry in the network element configured to process a data flow via the ports with another network element in accordance with a communications protocol. The communications protocol includes assigning respective incremental sequence numbers to segments of the data flow, transmitting the segments from the network element to the other network element in order of the sequence numbers thereof, and receiving respective acknowledgements of receipt of the segments from the other network element. Each of the acknowledgements includes the highest sequence number of the segments of the flow that were received in the other network element. The communications protocol includes transmitting the last segment of the data flow to the other network element, and thereafter transmitting an additional segment to the other network element.

In one aspect of the invention the additional segment is a control segment comprising an instruction to the other network element to make a determination from the sequence number of the control segment whether the last segment was received and to acknowledge the control segment only when the last segment was not received.

According to another aspect of the invention, the additional segment includes a dummy sequence number, and the communications protocol includes receiving a new acknowledgement of the dummy segment, determining from the new acknowledgement that the last segment of the data flow was not received by the other network element, and thereafter retransmitting the last segment of the data flow to the other network element.

According to one aspect of the apparatus, the communications protocol includes ascertaining that the sequence number of the new acknowledgement is less than the sequence number of the last segment.

According to a further aspect of the apparatus, the new acknowledgement is a negative acknowledgement.

According to yet another aspect of the apparatus, the dummy sequence number is the sequence number of a previously received acknowledgement.

According to one aspect of the apparatus, there are exactly three dummy segments.

According to an additional aspect of the apparatus, the new acknowledgement includes respective new acknowledgements of the dummy segments.

According to another aspect of the apparatus, in the communications protocol the segments are packets in which a header contains the sequence number and there is a payload and the dummy segment has a dummy header but lacks a dummy payload.

There is further provided according to embodiments of the invention a method, which is carried out by connecting a network element to a data network, and in the network element processing a data flow via ports of the network element to another network element in accordance with a communications protocol. The communications protocol includes assigning respective incremental sequence numbers to segments of the data flow, transmitting the segments from the network element to the other network element in order of the sequence numbers thereof, and receiving respective acknowledgements of receipt of the segments from the other network element. Each of the acknowledgements includes the highest sequence number of the segments of the flow that were received in the other network element. The communications protocol includes transmitting the last segment of the data flow to the other network element, and thereafter transmitting a dummy segment to the other network element that includes a dummy sequence number, receiving a new acknowledgement of the dummy segment, determining from the new acknowledgement that the last segment of the data flow was not received by the other network element, and thereafter retransmitting the last segment of the data flow to the other network element.

There is further provided according to embodiments of the invention a method, which is carried out by connecting a network element to a data network, and in the network element processing a data flow via ports of the network element to another network element in accordance with a communications protocol. The communications protocol includes assigning respective incremental sequence numbers to segments of the data flow, transmitting the segments from the network element to the other network element in order of the sequence numbers thereof, and receiving respective acknowledgements of receipt of the segments from the other network element. Each of the acknowledgements includes the highest sequence number of the segments of the flow that were received in the other network element. The communications protocol includes transmitting the last segment of the data flow to the other network element, and thereafter transmitting a control packet to the other network element that includes a control sequence number.

Another aspect of the method includes encoding control information in a header of the control packet and configuring the other network element to recognize the control packet from the control information. The control sequence number is equal to the sequence number of the last packet.

Yet another aspect of the method includes: in the other network element determining from the control sequence number that the last packet was not received by the other network element, thereafter transmitting an acknowledgement of the control packet from the other network element to the network element, and responsively to the acknowledgement, retransmitting the last packet from the network element to the other network element. The acknowledgement may include a plurality of successively transmitted acknowledgements.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions

According to RFC 6437, and as used herein, a flow (or data flow) is a sequence of packets sent from a particular source to a particular unicast, anycast, or multicast destination that the source desires to label as a flow. A flow could consist of all packets in a specific transport connection or a media stream.

Overview.

Figure 1:
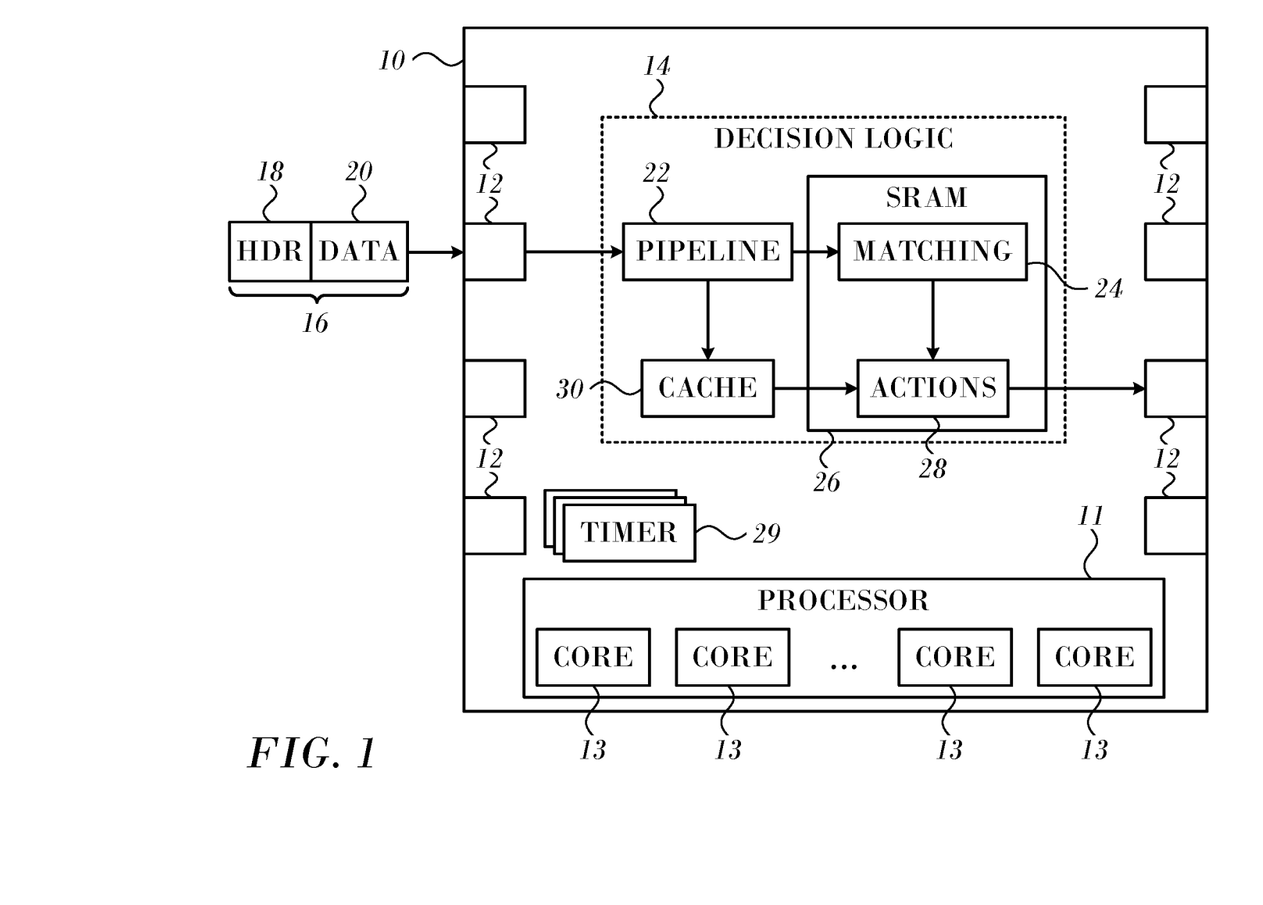
FIG. 1 is a block diagram of a typical network element, which transmits data such as packets in accordance with an embodiment of the invention.

Turning now to the drawings, reference is now made to FIG. 1, which is a block diagram of a typical network element 10, which transmits packets in accordance with an embodiment of the invention. The network element 10 may be configured as a network interface card (NIC), for example, with multiple ports 12 connected to a packet communication network. A processor 11, comprising any number of cores 13, is linked to decision logic 14, which is typically realized as electrical circuitry, such as a digital signal processor, field programmable gate array or hardwired logic. The decision logic 14 applies classification rules in forwarding data packets 16 between ports 12, as well as performing other actions, such as encapsulation and decapsulation, security filtering, and/or quality-of-service functions. In addition the decision logic 14 is configured for executing a communication protocol, which is described in further detail below. The circuitry needed for carrying out such forwarding using the protocol and other functions will be apparent to those skilled in the art and is omitted from the figures for the sake of simplicity, in order to concentrate on the communications protocol executed using the circuitry of the decision logic 14.

In the pictured embodiment, decision logic 14 receives packets 16, each containing a header 18 and payload data 20. The header 18 comprises a sequence number, such as a packet sequence number (or segment sequence number in embodiments that do not employ a packet format). A processing pipeline 22 in decision logic 14 extracts a classification key from each packet, typically (although not necessarily) including the contents of certain fields of header 18. For example, the key may comprise the source and destination addresses and ports and a protocol identifier. Pipeline 22 matches the key against a matching database 24 containing a set of rule entries, which is stored in an SRAM 26 in network element 10, as described in detail hereinbelow. SRAM 26 also contains a list of actions 28 to be performed when a key is found to match one of the rule entries and may include a forwarding database. For this purpose, each rule entry typically contains a pointer to the particular action that decision logic 14 is to apply to packets 16 in case of a match. Pipeline 22 typically comprises dedicated or programmable hardware logic, which is configured to carry out the functions described herein.

In addition, network element 10 includes timers 29, which are used in certain aspects of the communications protocol and a cache 30, which contains rules that have not been incorporated into the matching database 24 in SRAM 26. Cache 30 may contain, for example, rules that have recently been added to network element 10 and not yet incorporated into the data structure of matching database 24, and/or rules having rule patterns that occur with low frequency, so that their incorporation into the data structure of matching database 24 would be impractical. The entries in cache 30 likewise point to corresponding actions 28 in SRAM 26. Pipeline 22 may match the classification keys of all incoming packets 16 against both matching database 24 in SRAM 26 and cache 30. Alternatively, cache 30 may be addressed only if a given classification key does not match any of the rule entries in database 24 or if the matching rule entry indicates (based on the value of a designated flag, for example) that cache 30 should be checked, as well, for a possible match to a rule with higher priority.

Aspects of the present invention may be embodied in software programming code, which is typically maintained in permanent storage, such as a computer readable medium. In a client/server environment, such software programming code may be stored on a client or a server. The software programming code may be embodied on any of a variety of known non-transitory media for use with a data processing system, such as a USB memory, hard drive, electronic media or CD-ROM. The code may be distributed on such media, or may be distributed to users from the memory or storage of one computer system over a network of some type to storage devices on other computer systems such as the network element 10 for use by users of such other systems.

First Alternate Embodiment

Figure 2:
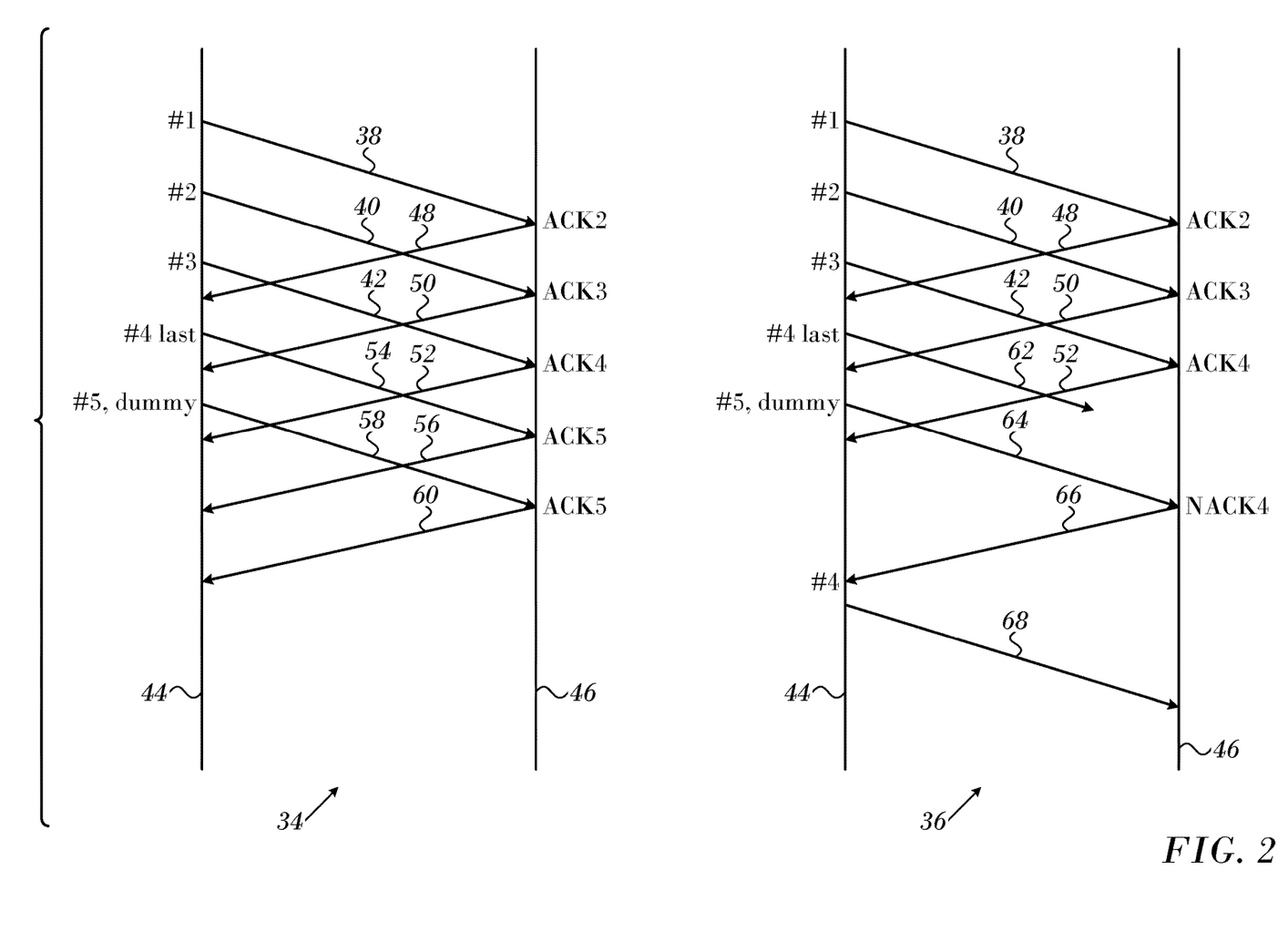
FIG. 2 is a set of ladder diagrams illustrating packet transmission in accordance with an embodiment of the invention.

Reference is now made to FIG. 2, which is a set of ladder diagrams 34, 36 illustrating packet transmission using the network element 10 (FIG. 1) in accordance with an embodiment of the invention. This embodiment is useful for receivers using conventional unmodified NICs. Diagram 34 illustrates the last four packets of a flow. There are no packet drops. Events 38, 40, 42 correspond to transmission of a sequence of packets from a sender 44 to receiver 46. Each packet in the sequence has an incremental sequence number that identifies its order in the sequence, i.e., #1, #2, #3 in the diagram 34. Determinations noted in the following description may be made by suitable modifications of the decision logic 14 (FIG. 1), which will be apparent to those skilled in the art.

Events 48, 50, 52 are a series of messages referred to as "ACKs" (ACK1, ACK2, ACK3) responsively to the events 38, 40, 42, respectively. The ACKs include the sequence number of the last packet successfully received. More specifically The sequence number included in an ACK is the highest sequence number of an uninterrupted series of numbers of previously received packets and may include the sequence number of the current packet. For example, if the current packet has a sequence number 5, and all packets having sequence numbers 1-4 were successfully received, then the ACK would include a sequence number 5. In some embodiments the sequence number is the last accepted number. In other embodiments the sequence number is the next expected sequence number However if the packet with sequence number 4 were dropped, the ACK, which in some protocols is a negative acknowledgement (NACK), would comprise an out-of-order sequence number 3, indicating to the sender that the packet having sequence number 4 needs to be retransmitted. Alternatively, the NACK may comprise the sequence number (sequence number 4) of the packet that needs to be retransmitted.

Event 54 corresponds to the transmission of the last packet in the flow (#4), and provokes event 56, which is an ACK (ACK5) indicating that the receiver 46 has received the last packet. Completion of the flow may now be recorded upon receipt of the ACK in event 56.

Conventionally, if the last packet of the flow were dropped, it would be necessary to await timer expiry before retransmitting the last packet. The delay is obviated according to embodiments of the invention by addition of a dummy packet to the flow: Without waiting for a timeout, or for event 56 to occur, in event 58 the sender 44 transmits a dummy packet to the receiver 46. The dummy packet is transmitted when there are no more "real" packets to transmit in the flow.

The dummy packet requires no data payload, but does include a dummy sequence number and information identifying the dummy packet as relating to the flow. The dummy sequence number can be any previously acknowledged sequence number of the flow. The receiver accords no special meaning to the dummy packet, but treats it like any other packet in the flow. The receiver 46 receives the dummy packet in event 60 and sends an ACK that includes the sequence number of the last packet successfully received in order, which in the example shown in the diagram 34 is the sequence number of the last packet of the flow. For example if packets 1, 2, 4, and 5 were received, the ACK would contain a sequence number that indicates that there was a gap at packet 3. This could be done by sending "2" (the last packet received in order) in the ACK. In an alternative embodiment, sending "3" (the next expected packet) in the ACK to an appropriately configured sender would allow the sender to conclude that there was a gap after packet 2, because packet 3 was not received.

It will be apparent that in protocols where there is no reordering of packets no new information is conveyed by the ACK in event 60 in response to the dummy packet because the last packet in the flow was already acknowledged in event 56. The dummy packet does not trigger a timeout by the sender 44. Thus, even if the dummy packet were dropped, there would be no impairment in the now ended flow.

In the diagram 36 the events 38, 40, 42 and the events 48, 50, 52 are identical to the diagram 34. The last packet of the flow (#4) is sent in event 62, but is lost and never reaches the receiver 46. The receiver 46 makes no response at this point. However, subsequently, in event 64, a dummy packet is sent by the sender 44 and arrives at the receiver 46. After examining the dummy packet, the receiver 46 recognizes that a sequence number, i.e., the sequence number of the last packet of the flow, is missing and sends a NACK in event 66. Upon receipt of the NACK, the sender 44 retransmits the last packet of the flow in event 68.

Second Alternate Embodiment

This embodiment provides backward compatibility for RoCE/InfiniBand. Continuing to refer to FIG. 2, in the diagram 36 in event 64, the dummy packet differs from that of the preceding embodiment. Its sequence number is not incremented relative to the last packet (#4); rather the sequence number of the dummy packet is the sequence number of a previously acknowledged packet. For example, the sequence number of the dummy packet could be the sequence number of the third packet (#3) sent in event 42, receipt of which was acknowledged by ACK4, sent by the receiver 46 in event 52. When the dummy packet is received, the receiver 46 identifies its sequence number as that of a previously received packet. The receiver 46 responds in event 66 with a NACK that contains the sequence number of the last received packet, which in this case is the next-to-last packet (#3). Upon receiving the NACK in event 66, the sender 44 becomes aware that the last packet of the flow (#4) was not received by the receiver 46, and accordingly retransmits the last packet of the flow in event 68.

Third Alternate Embodiment

This embodiment provides backward compatibility when TCP is used as the network protocol. TCP does not use NACKs. The sequence number of transmissions and acknowledgements here represent bytes in a stream, rather than packets. It is assumed that the Fast Retransmit/Fast Recovery congestion control protocol is in effect. This protocol is described in RFC 2581, which explains that a TCP receiver should send an immediate duplicate ACK when an out-of-order segment arrives. The purpose of this ACK is to inform the sender of the situation. In addition, a TCP receiver should send an immediate ACK when the incoming segment fills in all or part of a gap in the sequence space. This action generates timely information for a sender recovering from a loss through a retransmission timeout or a fast retransmit.

Figure 3:
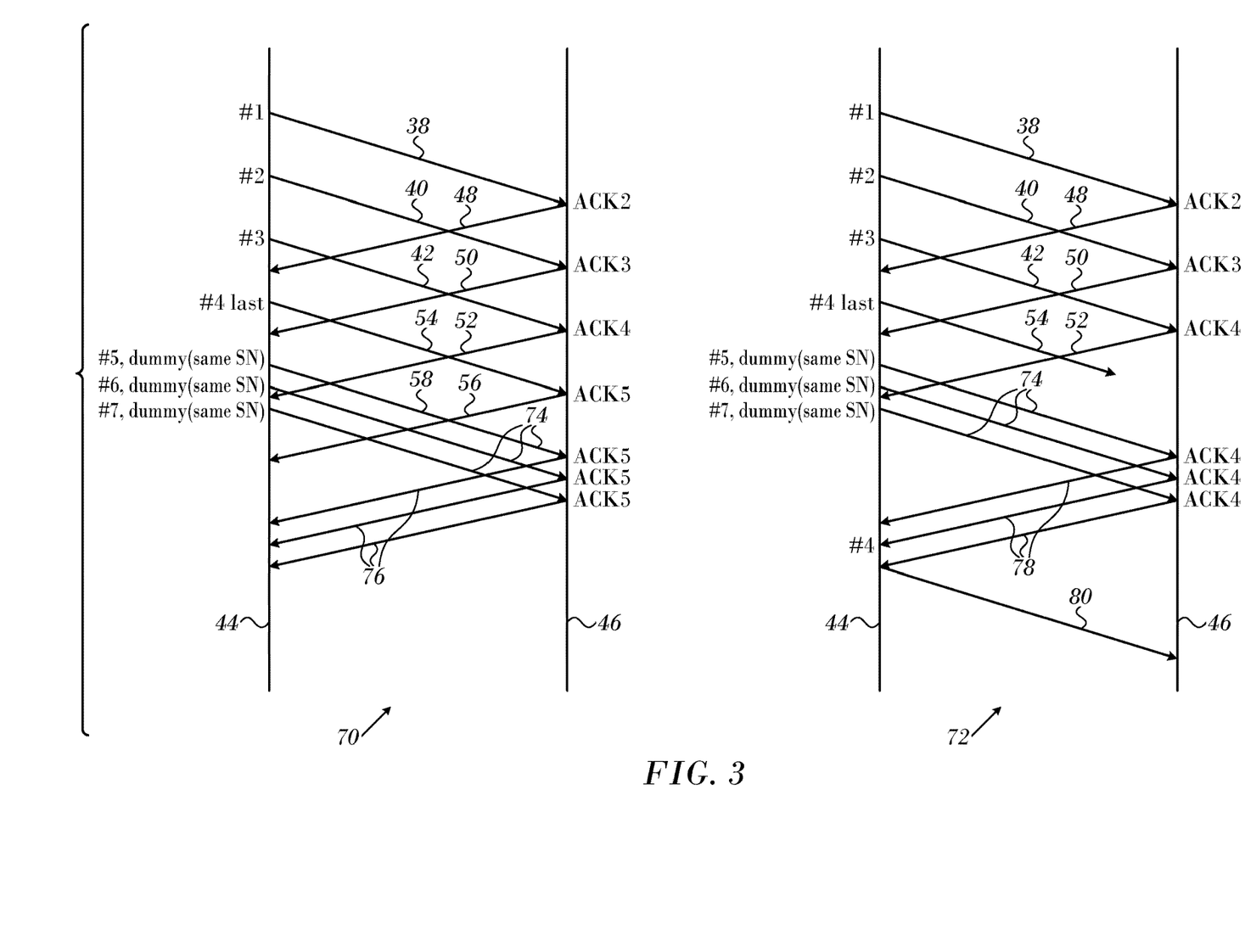
FIG. 3 is a set of ladder diagrams illustrating packet transmission in accordance with an alternate embodiment of the invention.

Reference is now made to FIG. 3, which is a set of ladder diagrams 70, 72 illustrating data transmission in accordance with an embodiment of the invention that employs the TCP protocol. After transmitting the last segment of the flow in event 54, and without waiting for event 56 or timeout to occur, in events 74 the sender 44 transmits a predetermined number of dummy data segments, e.g. three dummy data segments to the receiver 46 in succession without waiting for ACKs. The dummy segments have the same sequence number, which is one of the previously acknowledged sequence numbers as in the previous embodiment.

In events 76 the receiver 46 responds to each of the dummy segments by issuing an ACK, each having the last successfully received sequence number, as in the previous embodiment. Thus the events 76 constitute a series of three identical ACKs, which will inform the sender 44 whether or not the last segment of the flow arrived successfully, as in the previous embodiments. If the last segment of the flow arrived successfully, as in the diagram 70, the receiver 46 would issue a total of four duplicate ACKs in events 56, 76. While the information in the last three is redundant, the behavior of the transport protocol specification is not violated. Receipt of the four duplicate ACKs informs the sender 44 that the last segment of the flow was successfully received and therefore retransmission does not occur.

In the diagram 72 the last segment of the flow that was sent in event 54 is lost. The sender transmits the dummy segments in events 74 as in the diagram 70. The receiver 46 responds with ACKs in events 78. The sequence number in these ACKs is not the sequence number of the last segment of the flow, but an earlier one. The sender 44 recognizes this and concludes that the last segment of the flow was dropped. The sender 44 retransmits the last segment of the flow in event 80.

Fourth Alternate Embodiment

In this embodiment the dummy packet is replaced by a "control packet". Like the dummy packet, it lacks a data payload, but in other respects has the standard format of the protocol being employed. Indication codes are embedded in the header. For example, a conventional TCP header includes bits SYN and FIN to indicate start and finish of a flow. In the control packet another bit is encoded in the header. In this embodiment the receiver recognizes a meaning conveyed by the control packet and is configured to respond accordingly.

Figure 4:
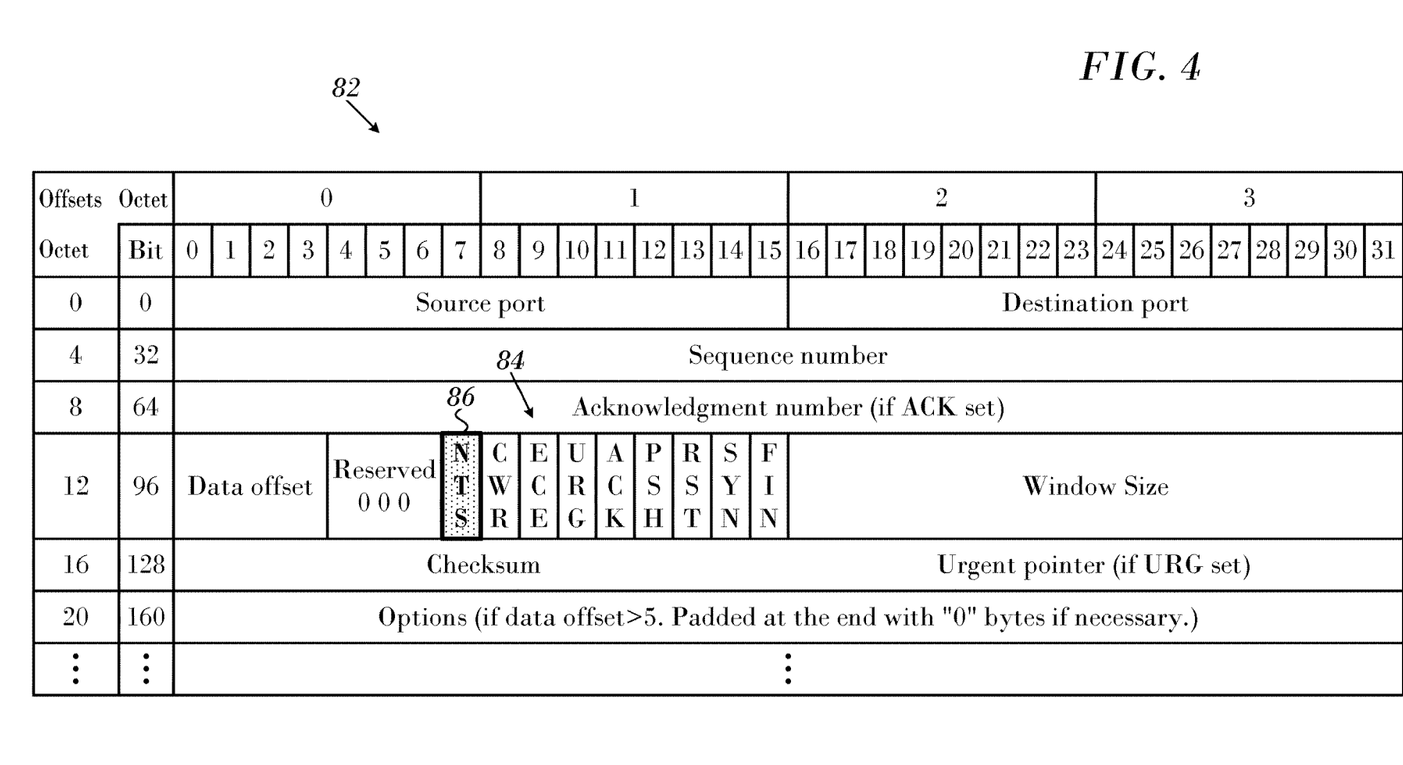
FIG. 4 is a diagram of a TCP header, which has been modified in accordance with an embodiment of the invention.

Reference is now made to FIG. 4, which is a diagram of a TCP header 82, which has been modified in accordance with an embodiment of the invention. Besides the standard control flags 84 an additional bit is assigned to a new control flag 86 (NTS), indicating "nothing to send"), which can be located in a reserved area. In the case of other protocols, a similar modification can be made. The details of modifying such headers is within the ordinary skill in the art.

Figure 5:
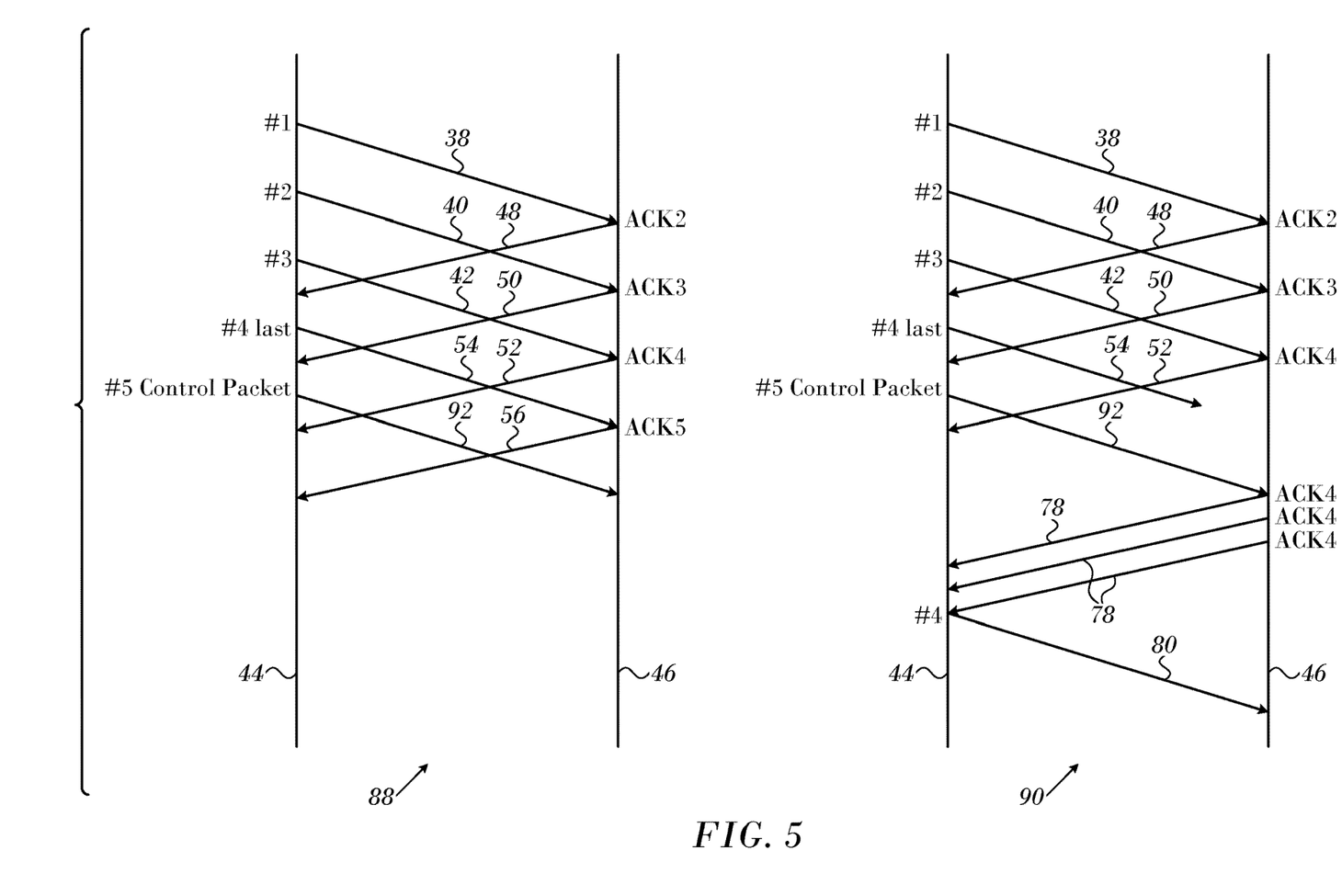
FIG. 5 is a set of ladder diagrams illustrating data transmission in accordance with an alternate embodiment of the invention.

The control flag 86 is interpreted as "I have nothing to send, but don't close the connection yet". A control packet is only acknowledged by the receiver if the last packet of the flow was not received. The control packet is not retransmitted. Its sequence number is equal to the sequence number of the last packet of the flow. The receiver inspects the control packet, and can determine from its sequence number whether the last packet of the flow was dropped. Moreover, if the control packet itself is dropped, the receiver does not see a gap in sequence numbers. The process is illustrated by FIG. 5, which is a set of ladder diagrams 88, 90 illustrating data transmission in accordance with an alternate embodiment of the invention that employs the TCP protocol. In diagram 88, after event 54, the sender 44 sends a control packet in event 92. The receiver 46 notes the sequence number of the control packet as described in the previous embodiments and determines that the last packet of the flow was not dropped. When an acknowledgement to the last packet of the flow is received by the sender 44 as expected in event 56, the flow is marked as completed. As noted above, no acknowledgement of the control packet is sent or expected.

In diagram go, the last packet of the flow was dropped in event 54. After receiving the control packet in event 92, the receiver 46 a response becomes aware of the dropped packet and responds in a manner appropriate to the protocol being employed. In diagram go three ACK packets are sent, each having the same sequence number as the dropped packet. The sender 44 then retransmits the packet in event 80.

In the case of RoCE/1B a NACK is sent instead of the three ACK packets.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method, comprising the steps of:
    connecting a network element having communication ports to a data network;
    in the network element processing a data flow via the ports to another network element in accordance with a communications protocol, wherein the communications protocol comprises:
    assigning respective incremental sequence numbers to packets of the data flow, the packets including a last packet;
    transmitting the packets of the data flow from the network element except for the last packet to the other network element in order of the sequence numbers thereof;
    receiving respective acknowledgements of receipt of the packets of the data flow from the other network element, each of the acknowledgements including a highest sequence number of an uninterrupted series of sequence numbers of the packets of the data flow that were previously received in the other network element;
    transmitting the last packet of the data flow to the other network element; and
    thereafter, without awaiting an acknowledgement of receipt of the last packet of the data flow from the other network element, transmitting a control packet from the network element to the other network element that includes a control sequence number.

2. The method according to claim 1, further comprising the steps of:
    encoding control information in a header of the control packet, and the control sequence number is equal to the sequence number of the last packet; and
    configuring the other network element to recognize the control packet from the control information.

3. The method according to claim 1, further comprising the steps of:
    determining in the other network element from the control sequence number that the last packet was not received by the other network element;
    thereafter transmitting a control acknowledgement of the control packet from the other network element to the network element; and
    responsively to the control acknowledgement, retransmitting the last packet from the network element to the other network element.

4. The method according to claim 3, wherein the control acknowledgement comprises a plurality of successively transmitted acknowledgements.

5. A method, comprising the steps of:
    connecting a network element having communication ports to a data network;
    in the network element processing a data flow via the ports to another network element in accordance with a communications protocol, wherein the communications protocol comprises:
    assigning respective incremental sequence numbers to segments of the data flow, the segments including a last segment;
    transmitting the segments from the network element to the other network element except for the last segment in order of the sequence numbers thereof;
    receiving respective acknowledgements of receipt of the segments of the data flow from the other network element, each of the acknowledgements including a highest sequence number of an uninterrupted series of sequence numbers of the segments of the data flow that were previously received in the other network element;
    transmitting the last segment of the data flow to the other network element; and
    thereafter, without awaiting an acknowledgement of receipt of the last segment of the data flow from the other network element transmitting a dummy segment from the network element to the other network element that includes a dummy sequence number.

6. The method according to claim 5, further comprising the steps of:
    receiving a new acknowledgement of the dummy segment; and
    determining from the new acknowledgement that the last segment was not received by the other network element; and
    thereafter retransmitting the last segment to the other network element.

7. The method according to claim 6, wherein the step of determining comprises ascertaining that the sequence number of the new acknowledgement is less than the sequence number of the last segment.

8. The method according to claim 6, wherein in the communications protocol the new acknowledgement is a negative acknowledgement.

9. The method according to claim 5, wherein in the communications protocol the dummy sequence number is the sequence number of a previously received acknowledgement.

10. The method according to claim 5, wherein in the communications protocol the dummy segment comprises a plurality of successively transmitted dummy segments having identical dummy sequence numbers.

11. The method according to claim 10, wherein there are exactly three dummy segments.

12. The method according to claim 5, wherein in the communications protocol the segments are packets having a header containing the sequence number and having a payload and the dummy segment has a dummy header and lacks a dummy payload.

13. Apparatus, comprising:
a network element having communication ports connected to a data network; and
electrical circuitry in the network element configured to process a data flow via the ports to another network element in accordance with a communications protocol, wherein the communications protocol comprises:
assigning respective incremental sequence numbers to segments of the data flow, the segments including a last segment;
transmitting the segments from the network element to the other network element except for the last segment in order of the sequence numbers thereof;
receiving respective acknowledgements of receipt of the segments of the data flow from the other network element, each of the acknowledgements including a highest sequence number of an uninterrupted series of sequence numbers of the segments of the data flow that were previously received in the other network element;
transmitting the last segment to the other network element; and
thereafter, without awaiting an acknowledgement of receipt of the last segment of the data flow from the other network element transmitting an additional segment from the network element to the other network element, wherein the additional segment identifies the data flow.

14. The apparatus according to claim 13, wherein the additional segment is a control segment comprising an instruction to the other network element to make a determination from the sequence number of the control segment whether the last segment was received and to acknowledge the control segment only when the last segment was not received.

15. The apparatus according to claim 13, wherein the additional segment is a dummy segment that includes a dummy sequence number and lacks a data payload.

16. The apparatus according to claim 15, wherein the communications protocol comprises:
receiving a new acknowledgement of the dummy segment;
determining from the new acknowledgement that the last segment was not received by the other network element; and
thereafter retransmitting the last segment to the other network element.

17. The apparatus according to claim 16, wherein determining from the new acknowledgement comprises ascertaining that the sequence number of the new acknowledgement is less than the sequence number of the last segment.

18. The apparatus according to claim 16, wherein in the communications protocol the new acknowledgement is a negative acknowledgement.

19. The apparatus according to claim 15, wherein in the communications protocol the dummy sequence number is the sequence number of a previously received acknowledgement.

20. The apparatus according to claim 15, wherein in the communications protocol the dummy segment comprises a plurality of successively transmitted dummy segments having identical dummy sequence numbers.

21. The apparatus according to claim 20, wherein there are exactly three dummy segments.

22. The apparatus according to claim 15, wherein in the communications protocol the segments are packets having a header containing the sequence number.

* * * * *